US012304102B2

(12) United States Patent
Moesle

(10) Patent No.: US 12,304,102 B2
(45) Date of Patent: May 20, 2025

(54) METHOD FOR ELIMINATING REJECTS AND TRANSPORT UNIT SUITABLE THEREFOR

(71) Applicant: MULTIVAC SEPP HAGGENMUELLER SE & CO. KG, Wolfertschwenden (DE)

(72) Inventor: Manuel Moesle, Altusried (DE)

(73) Assignee: MULTIVAC Sepp Haggenmueller Se & Co. KG, Wolfertschwenden (DE)

( * ) Notice: Subject to any disclaimer, the term of this patent is extended or adjusted under 35 U.S.C. 154(b) by 0 days.

(21) Appl. No.: 18/233,205

(22) Filed: Aug. 11, 2023

(65) Prior Publication Data

US 2024/0058979 A1 Feb. 22, 2024

(30) Foreign Application Priority Data

Aug. 16, 2022 (DE) ......................... 102022120642.4

(51) Int. Cl.
*B26D 7/18* (2006.01)
*B26D 5/00* (2006.01)
*B26D 7/06* (2006.01)

(52) U.S. Cl.
CPC ........... *B26D 7/1836* (2013.01); *B26D 5/007* (2013.01); *B26D 7/0625* (2013.01); *B26D 2210/02* (2013.01)

(58) Field of Classification Search
None
See application file for complete search history.

(56) References Cited

U.S. PATENT DOCUMENTS 5,934,440 A 8/1999 Kroghrud
6,522,945 B2 * 2/2003 Sleep .................... B65B 65/003 53/493

(Continued)

FOREIGN PATENT DOCUMENTS

DE 697 15 876 T2 4/2003
DE 102020201067 A1 * 7/2021 ........... B65B 31/024

(Continued)

OTHER PUBLICATIONS

German Search Report Dated Jul. 31, 2023, Application No. 10 2022 120 642.4, Applicant Multivac Sepp Haggenmüeller SE & Co. KG, 8 Pages.

*Primary Examiner* — Tanzim Imam
(74) *Attorney, Agent, or Firm* — Brooks Kushman P.C.

(57) ABSTRACT

A transport unit, such as a feeder of a packaging device, is provided, wherein the loading of the transport unit by portions is registered by a control and stored in a memory of the control. The transport unit, in particular its operating unit, is designed in such a manner that an operator can select and mark food pieces or portions to be removed from the transport unit and actually removed, on a display of the operating unit where they are displayed in a run during operation of the transport unit, whereupon the control automatically deletes the food pieces or portions in its memory. For this purpose, the operator observes the transported food pieces or portions, preferably in reality, or on the display of the operating unit, and marks them as rejects, either by clicking on them with a cursor or touching them in the case of a touch-sensitive display.

12 Claims, 8 Drawing Sheets

(56) References Cited

U.S. PATENT DOCUMENTS

| | | | | |
|---|---|---|---|---|
| 8,387,342 | B2 * | 3/2013 | Rutschmann | B65B 57/14 53/500 |
| 8,943,779 | B2 * | 2/2015 | Amano | G06V 20/66 378/57 |
| 2011/0005171 | A1 * | 1/2011 | Woerz | B65G 47/268 53/448 |
| 2020/0307839 | A1 * | 10/2020 | Franzaroli | B65B 57/02 700/223 |

FOREIGN PATENT DOCUMENTS

| | | | | |
|---|---|---|---|---|
| EP | 3547246 | A1 * | 10/2019 | G06Q 10/083 |
| EP | 3 919 394 | A1 | 12/2021 | |

* cited by examiner

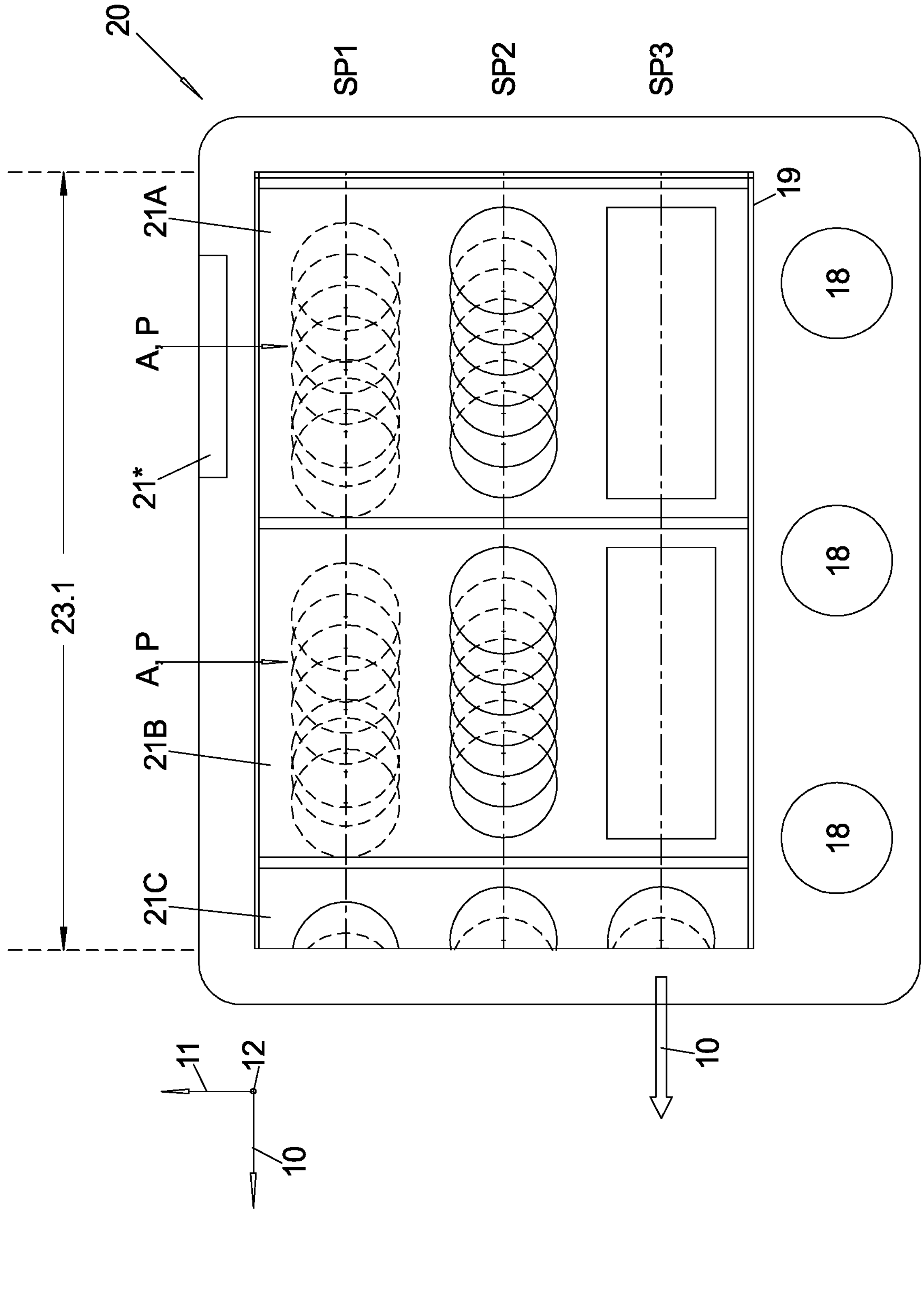
Fig. 3a1

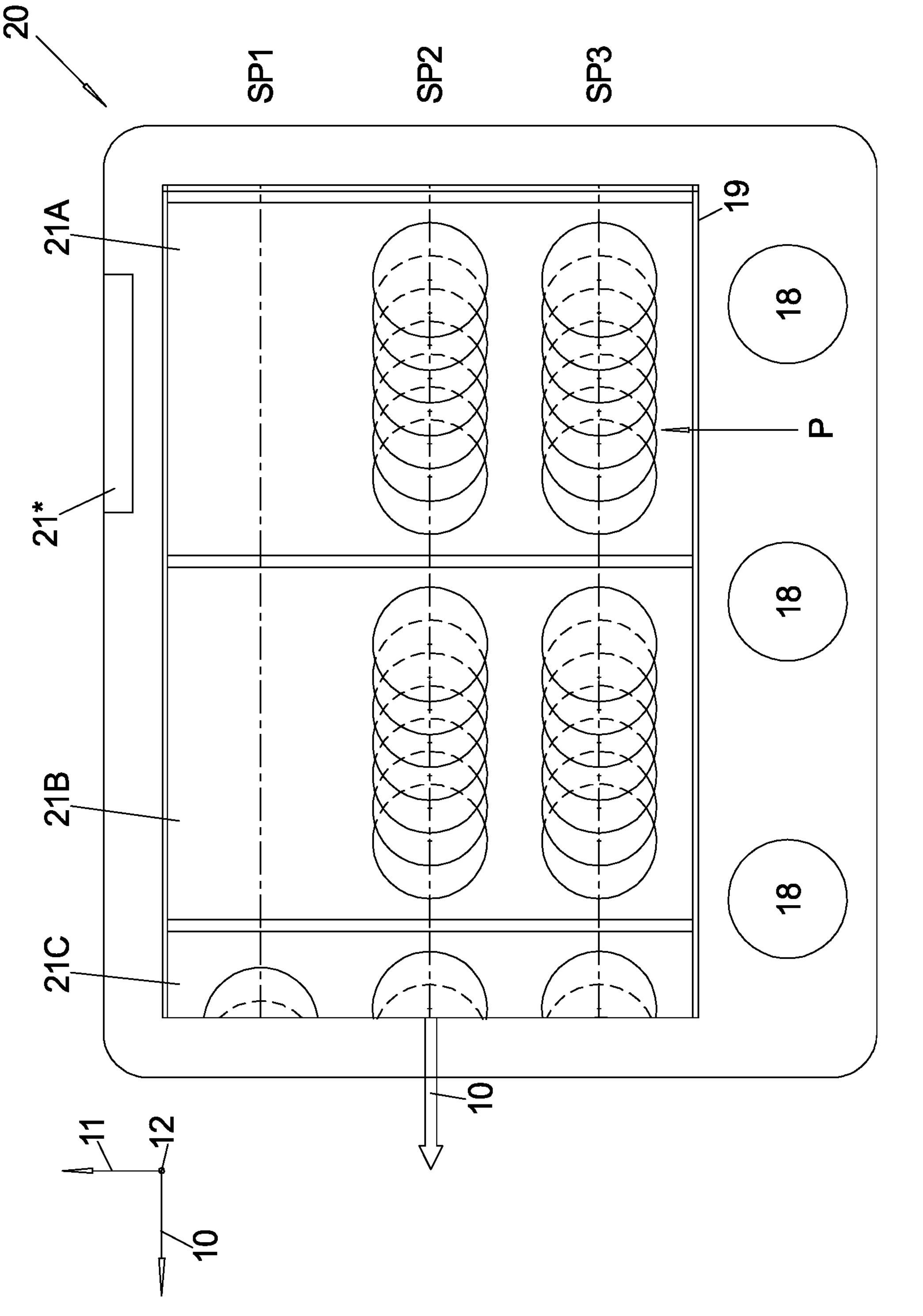
Fig. 3a2

METHOD FOR ELIMINATING REJECTS AND TRANSPORT UNIT SUITABLE THEREFOR

CROSS-REFERENCE TO RELATED APPLICATIONS

This application claims priority to German Patent Application No. DE 102022120642.4 filed on Aug. 16, 2022, the disclosure of which is incorporated in its entirety by reference herein.

TECHNICAL FIELD

The invention relates to the food industry, in which the produced food pieces often have to be transported over a transport route and rejects of food pieces have to be removed from the current of the food pieces.

A reject does not necessarily mean low-quality food, but also underweight pieces or portions, or pieces of food that have merely been incorrectly arranged for the subsequent process, such as packaging.

The food pieces can be, in particular, slices of sausage or cheese, which are cut upstream by a so-called slicer from long product calibers of this food product.

BACKGROUND

Such transport units often consist of several conveyors arranged one behind the other in the transport direction, i.e. the direction of flow through a plant, and/or the products can be transported in single or multiple lanes or distributed on the conveyors without lanes, i.e. randomly arranged.

Particularly in the case of portions consisting of several shingled slices of sausage or cheese, some of which overlap one another, the downstream processing step often consists of packaging.

The, for example shingled, portions are usually produced on the so-called portioning belt by its intermittent drive. The portioning belt is usually part of a discharge unit consisting of several, usually three, discharge conveyors in succession, which are generally also part of the slicer and are controlled by the slicer's control system.

The so-called feeder is connected to this and extends to the feeding position of the packaging machine, but can also include the transport belts directly behind the portioning belt.

This transport unit can be the feeder in that the only or last conveyor of this transport unit drops the portion into the trough of a trough belt passing underneath or deposits it on a flat packaging board.

Here, very precise positioning of the portion on the packaging element or in the trough is important, and, if it is foreseeable in advance that the actual arrangement on the transport unit deviates too much from the desired arrangement, so that it can no longer be corrected in particular, or there are errors within the portion which can no longer be corrected, the portion must be removed, if possible before it is deposited on or in the packaging element, in order to avoid reject packages.

The removal of the one or more food pieces is preferably done manually, but can also be done automatically, e.g. by means of gripper robots or also switching flaps for diverting the food piece, the latter being less suitable for portions of sausage or cheese slices.

In the following, the problem and solution are described primarily on the basis of slices and portions which are produced by a slicer and are to be deposited in a trough conveyor, but which can occur in the same way for other food pieces:

The current solution is that the operator observes the portions produced in the slicer—usually in about four lanes next to each other—either directly at the point of origin, i.e. on the portioning belt or one of the downstream belts of the discharge conveyor of the slicer, or as a picture from there on the display of his operating unit.

Certain product pieces or portions may already be marked as rejects on the display, for example because an upstream scale connected to the control system has determined an incorrect, usually too low, weight for the product piece or portion.

In the event of unacceptable irregularities, the controller classifies these as rejects and brings the conveyor to a halt by actuating a stop switch between the point of origin of the slice or portion and the feeding point, i.e. in the area of the conveyor section.

In view of the cycle frequency of about 40 consecutively produced slices per second and a number of usually less than 10 slices per portion, this requires a high level of attention from the operator.

The operator then removes the one or more portions that he or the control system has determined to be rejects from the transport unit, closes the protective covers of the machine again and starts the machine at the operating unit.

The problem is that, as a rule, the slices or portions passing through the transport section are detected by an optical sensor, be it a line scanner or a camera, across the entire width of the transport unit, so that the control at least knows which portions are present, at which longitudinal position—which is included in the movement of the transport unit—and, if necessary, on which track.

As soon as the operator manually changes this constellation of slices or portions on the feeder, such as removing the rejects, the contents stored with regard to the portions no longer correspond to reality.

However, such a parallel adjustment of the stored contents to portions in the control system was not previously provided for or was very difficult to implement, which is why operators under time pressure omit this, resulting in subsequently sealed reject packages that can also be handled by mistake, but must at least be sorted out at a later point.

Already on the portioning belt, the portions may not be in the desired, predefined shape or size, or the portions may not be positioned relative to each other, for example due to a number of influencing factors, such as

- the centrifugal force generated by the fast rotating blade,
- the adhesion of the slices to the blade,
- the non-constant accelerations of all tracks of the discharge conveyor unit at the track-individually designed discharge units.

For example the portion may be too long or too short, the longitudinal spacing of the slices within the portion may be uneven, or the slices may not lie in exactly one row in the longitudinal direction, but have too great a lateral offset from one another, which has been attempted in part to date to correct already within the discharge unit or on the portioning belt.

It is known to use a camera to detect the position of the portions and their individual slices already on the portioning belt, in some cases while the portion is still being formed, and to improve the design of the portion at least for subsequent portions by readjusting the forming parameters, e.g. by transversely adjusting the individual tracks or the entire portioning belt between the impact of two successive slices.

However, even if the portion produced on the portioning belt corresponds to the target specifications there, the subsequent movements of the portion up to the packaging element, for example the transfers between individual conveyors, in particular to the inclined insertion belt, possibly further transfers due to the buffer arranged between the discharge unit of the slicer and the feeder, can lead to renewed undesirable changes in the size, shape and position of the portions.

SUMMARY

It is therefore the object of the invention to provide a method for eliminating rejects from food pieces on a transport unit, in which, despite manual removal of slices or portions as rejects in the memory of the control, the stock of slices or portions present in the transport unit is adjusted according to reality and the portions removed from the transport unit are also removed in the memory of the control. Furthermore, the object consists in providing a transport unit suitable for this purpose.

With regard to the method for eliminating rejects from a transport unit, the object is achieved in that the monitoring area of the transport section along which the transport unit extends, which is monitored by a non-contact, usually optical, sensor, in particular a camera, is permanently shown on the display of an operating unit so that the passing pieces or portions of the food are shown there realistically—in the case of a camera—or symbolically.

The representation on the display can also be time-delayed with respect to the passage of the corresponding pieces or portions through the observation area, i.e. the representation area currently visible on the display can be a different area along the transport unit than the observation area observed by the sensor or the camera.

If a reject is detected in the passing pieces or portions, preferably by the operator—who observes this directly on the transport unit or on the display —, the at least one conveyor of the transport unit is stopped, preferably by the operator, and the corresponding portion or piece is selected as a reject, preferably by the operator, and marked as a reject on the display of the operating unit, which the operator typically does by touching the corresponding piece or portion on the touch display in the case of a touch-sensitive display, or by clicking on the piece or portion with the cursor of the display in the case of a non-touch-sensitive display.

By selecting a piece or portion as a reject, the control automatically changes on the display the representation of this reject either only to indicate the selection or the corresponding representation is immediately cleared on the display.

Before or after marking, the reject is removed from the transport unit, preferably manually by the operator or also by a removal device controlled by the control.

Similarly, the reject, i.e. the portion or food piece, is automatically deleted from the memory of the control system, which is done in any case, but preferably only after the operator has confirmed that he—after stopping the transport unit—has actually removed this reject.

This can be done in particular by the operator selecting again the reject that has already been marked and changed in its display, i.e. by clicking or touching it, and only after this second step the representation is removed from the display and this piece or portion is also removed from the memory of the control.

In order to facilitate the work of the operator, the control can contain an image recognition system which continuously analyzes the images of the sensor, in particular of the camera itself, and, if a presumed reject is detected, gives the operator a corresponding visual indication on the display.

If the image recognition is good enough, the classification and selection as a reject can also be left entirely to the control system, which then automatically marks a particular piece or product as a reject and stops the belt so that the operator can remove the marked reject.

If, in doing so, he determines that the control's selection was incorrect and the portion is not a reject, he can reset the selection by the control as a reject before restarting the machine.

The control system can also indicate a portion or food piece as a reject on the display for reasons other than position or arrangement, for example because a scale upstream, which is data-technically connected to the control system, has classified this portion or piece as being of the wrong weight. The operator will then remove that reject from the transport unit as well.

If the operator has selected a reject, the belt will then stop automatically—depending on the configuration of the control—or the operator must also press a stop button. The automatic stop makes more sense, since the control can then stop the transport unit in such a position that the piece or portion selected as a reject is located in a specific area in the passage direction that is particularly suitable, for example easily accessible, for removal by the operator.

In the case of an additional actuation of a stop button, this means on the one hand a loss of time, and on the other hand this advantage is then usually not given.

If the machine is running very fast and a very quick stop is necessary for the removal of the reject, the sequence can also be provided in such a way that the operator first actuates a stop button when a reject is detected and only then selects and marks the corresponding piece or product as a reject without any time pressure.

As soon as the transport unit is at a standstill and any protective devices have been opened, the operator removes the reject from the transport unit.

He informs the control of the corresponding gaps as described above, in particular by confirming, preferably individually, the removal of the part or product previously marked as a reject to the control.

He can then manually actuate a start switch, whereby the transport unit and, as a rule, also the upstream processing unit such as a slicer—which must also be shut down together with the conveyor unit if there is insufficient buffer space in between—are restarted by the control. As a rule, the control only does this on condition that all pieces or portions previously marked as rejects have been confirmed as removed by the operator.

In a simpler version, the operator simply presses the start button after removing the reject(s), and the control restarts the transport unit and usually also the upstream processing unit, trusting that the operator has actually removed all the products or pieces previously marked as rejects.

Whether the removal of the reject from the transport line, i.e. from the transport unit, is done before or after the selection of the corresponding piece or product on the screen as a reject is up to the operator, but due to time constraints it will usually be done afterwards.

If a reject portion is detected on a multi-track machine on not all, for example only one, track, this does not mean that all pieces or portions located at the same transport position next to each other on the other tracks must also be rejects, so that the selection and/or the removal of the reject(s) from the transport section can take place only on one track, on several tracks or across all tracks next to each other at the same time.

A transport unit for transporting food pieces or portions consisting of them along a transport path usually comprises:

- one or more controllable conveyors following one another in the transport direction, which pass the pieces conveyed on them on to one another in the transport direction, in particular belt conveyors,
- a control for controlling moving parts of the transport unit, which also stores a memory for storing the presence and/or position of the pieces or portions along the transport path, preferably together with the running speed and running times of the transport unit, so that the position of the pieces or portions is known to the control at all times,
- an operating unit with, on the one hand, a display and, on the other hand, at least one operating element for the input of data or commands by the operator via the operating unit into the control, as well as
- a non-contact, in particular optical sensor, in particular a camera, above the transport section, the monitoring area of which scans a monitoring area, preferably located in the upstream half of the transport section, with regard to products or portions present there, preferably over the entire width of the transport unit, and which is data-technically connected to the control system, which receives this information.

According to the invention, the operating unit, in particular its display, is designed to display a display area of the transport unit with pieces or portions lying on it realistically or symbolically in the top view, in particular to display the monitoring area of the transport unit monitored by the sensor in the top view. Due to a time offset between scanning by the sensor and representation on the display, however, the display area may be offset downstream relative to the observation area.

The control is, in particular its operating elements are, designed to mark food pieces or portions visible on the display individually as deleted, which are then deleted on the display and deleted in the memory of the control as no longer present, or in that they are initially displayed differently when marked as deleted and are only deleted in the memory of the control after a further confirmation.

This makes it very easy for the operator to enter the actual load status of the transport unit into the control system via the display, and the memory contents of the transport unit can thus be kept synchronized with the actual contents of the transport unit in terms of food items or products.

Preferably, the transport unit is designed to carry out the method as described above.

A typical application is that the transport unit is the so-called feeder, which is functionally, usually also locally, arranged downstream of a food handling unit such as a slicer—which slices food calibers into slices—and a downstream further handling machine, such as a packaging machine, and with its downstream end selectively drops the pieces or portions lying on it into the e.g. troughs of a trough belt, which for this purpose is usually fed below the transport unit.

BRIEF DESCRIPTION OF THE DRAWINGS

Embodiments according to the invention are described in more detail below by way of example and with reference to the following drawings, which show:

FIGS. 3*a*1, 3*a*2: a view analogous to FIG. 2*a* with a 1st reject situation, with the reject marked in the display or already removed in the display, FIGS. 3*b*, *c*: views analogous to FIG. 2*a*, with other reject situations shown with the reject marked in the display.

DETAILED DESCRIPTION

Figure 1A:
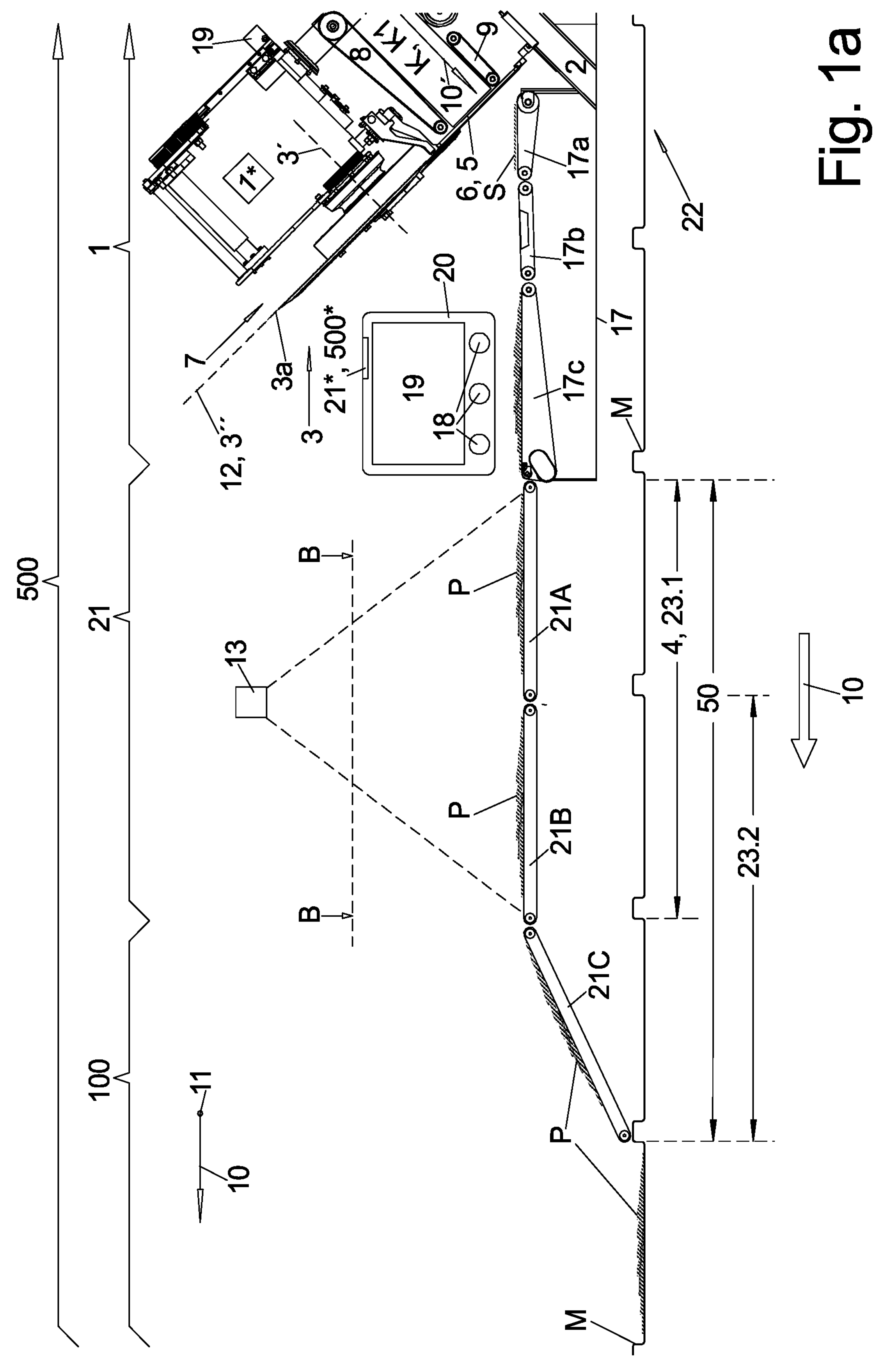
FIG. 1*a*: a packaging device consisting of a slicer as well as a packaging machine arranged downstream in the longitudinal direction, the passage direction through the machine, with a feeder, viewed in the side view, the transverse direction of the packaging device.

FIG. 1*a* shows a side view of a packaging unit 500 with—in passage direction through the entire unit—a slicer 1, a feeder 21 with several conveyors 21A, 21B, 21C one behind the other in passage direction 10, as well as a packaging machine 100 and an operating unit 20 with a display 19 and a control, which as control 21* controls at least the feeder 21 or as control 500* the entire packaging unit 500.

Of the slicer 1, which is only partially shown, the cutting unit 7 is visible, as well as of the supply unit for the calibers K, the upper product guide 8 and the bottom product guide 9, between which the calibers K are held and supplied to the cutting unit 7 in a supplying direction 10' which is at an angle to the horizontal throughput direction 10 through the machine.

The blade 3, whose sharply ground cutting edge 3*a* defines the cutting plane 3", lies at a very short distance parallel to the underside of the plate-shaped cutting frame 5, in which for the mostly several calibers K1, K2 . . . , which are located one behind the other in the direction of view of FIG. 1*a* and are sliced at the same time, there is in each case one product opening 6 which is only indicated here, through which the calibers K fit very precisely, so that the circumferential edge of the cutting frame 5 and its product openings 6 form the fixed counter-edge to the cutting edge 3*a* of the blade 3.

Not only the cutting unit 7 and the supply unit for the calibers K are attached to the base frame 2 of the slicer 1, but also, as a rule, a discharge unit 17 consisting of three discharge conveyors 17*a, b, c* located one behind the other in the passage direction 10, the rear-most of which in the passage direction 10, the portioning belt 17*a*, can be pivoted in various ways in its inclined position about a pivot axis running in the direction of view of FIG. 1*a*, so that it can be controlled with which angle of impact and with which trajectory and distance the slices S separated from the caliber K strike the portioning belt 17*a*. Since the portioning belt 17*a* can also be driven in a stepwise controlled manner in passage direction 10, shingled portions P can be produced on it, for example.

A trough belt 22, also running from right to left in the passage direction 10, is often supplied under the slicer 1, in each of whose troughs M a portion P consisting of several slices S is to be deposited.

In order to compensate for the height offset and also the distance between the trough belt 22 and the end of the discharge conveyor 17, which is generally horizontal, a so-called feeder 21 is connected to the last discharge conveyor 17*c* of the discharge unit 17. This is also at least one, in this case three conveyor belts 21A, 21B, 21C arranged one behind the other in the passage direction 10, of which in this case the first two 21A, 21B run horizontally and the last conveyor belt 21C is directed obliquely downwards and ends just above the trough belt 22 and discharges the portions P into the troughs M. The conveyor belts 21A, 21B and 21C are arranged one behind the other in the passage direction 10.

For this purpose, the feeder 21, at least its last ejecting conveyor belt 21C, and the trough belt 22 are driven at the same speed in order to prevent the portions P from folding when they are deposited, or better dropped, in the trough M. The trough belt 22 is driven at the same speed as the feeder 21, at least its last dropping conveyor belt 21C. Between the insertion of the individual portions P, the trough belt 22 and/or the feeder 21 can be stopped in each case.

The feeder 21 can also be used as a buffer.

To prevent defective portions P, i.e. rejects A, from entering the troughs M of the trough belt 22, already the portions P transported on the feeder 21 are checked.

For this purpose, a monitoring area 4 of a camera 13 is aligned at least on a part of the transport section 50, in this case extending over the two horizontally running conveyor belts 21A, 21B in longitudinal direction and extending over the entire width of the feeder 21 in transverse direction, and the video permanently recorded by this camera is reproduced on the display 19 of an operating unit 20.

The display 19 shows the viewing area 23, which also extends in longitudinal direction over a certain part of the transport section 50 and in transverse direction over the entire width of the feeder 21, as shown in FIGS. 3*a*1 to 3*c*.

The representation can be realistic—i.e. with recognizable individual slices and their position within the portion, in particular if the sensor is a camera 13 and the control has sufficient computing power—as shown in FIG. 3*a*1 in tracks SP 1 and SP2 and in the remaining FIGS. 3*a*2 to 3*c* on all tracks, or it can be merely a symbolic representation, representing a portion for example only as a rectangle, as shown in FIG. 3*a*1 on track SP 3, which is particularly the case if the sensor 13 is, for example, only a light barrier or a line scanner.

In the case of a just-in-time display on the display 19, the observation area 4 also corresponds to the observation area 23.1—as shown in FIG. 1*a*—in the case of a time offset of the representation on the display, the observation area 23.2 visible on the display can be partially or completely downstream of the observation area 4.

As a rule, the operator checks the video running on the display 19 or also the real portions P on the feeder 21 to see whether the portions P passing through there are faulty, i.e. rejects, or not.

Figure 2B:
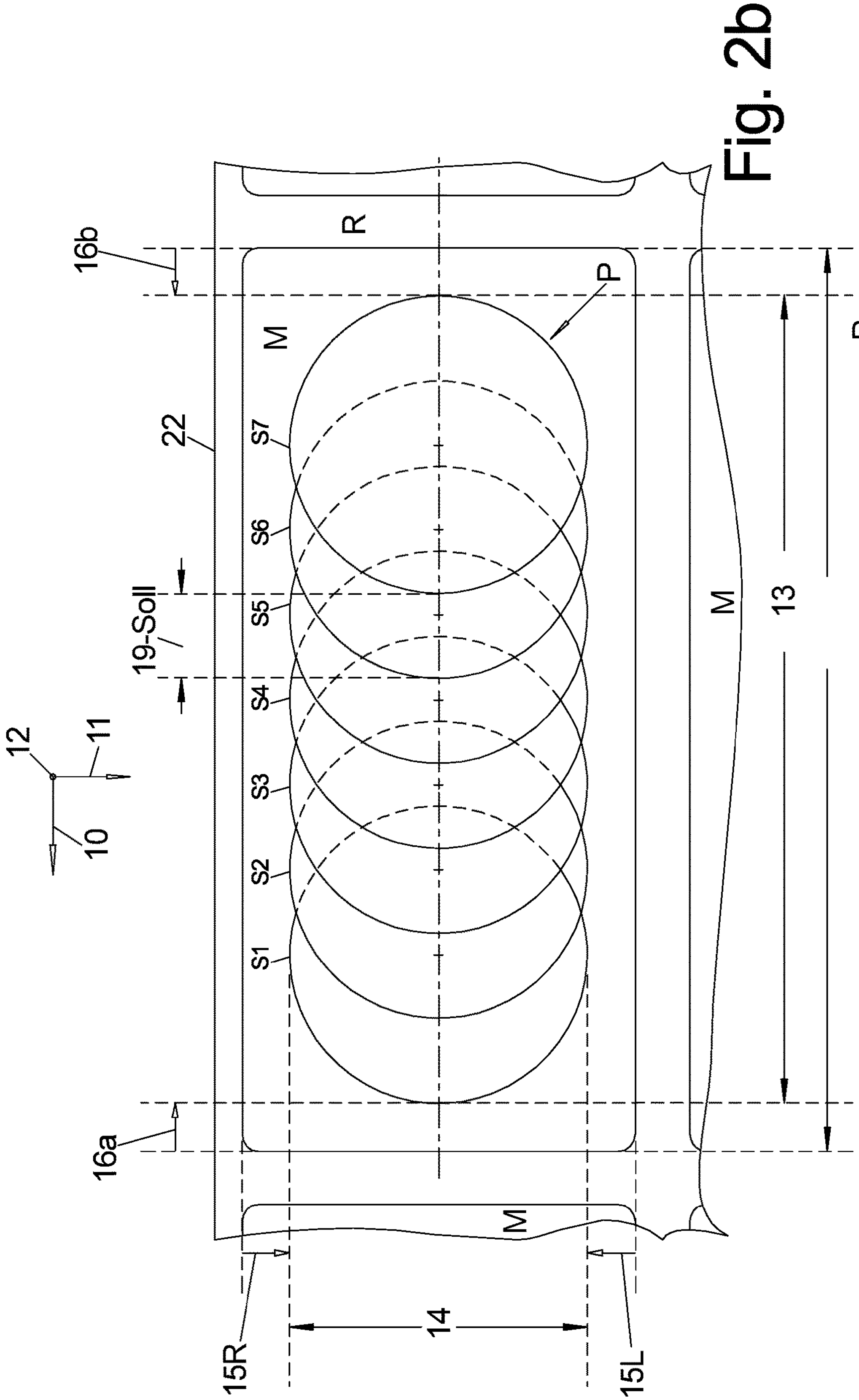
FIGS. 1*b*, 2*b*: a single filled trough in side view and top view as enlargements from FIGS. 1*a* and 2*a*, respectively, with the slices of the portion in ideal position in the trough, i.e. in the desired arrangement.
Figure 1B:
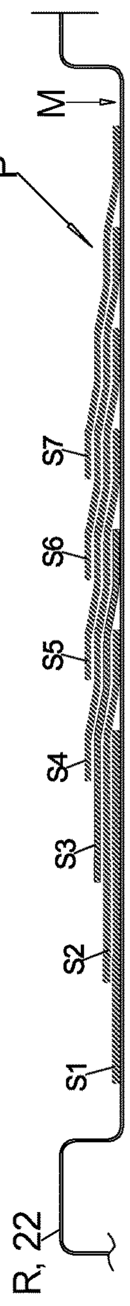

Only correct portions P are allowed to pass, and only with correct portions P can it be achieved that these subsequently also lie in a target arrangement in a respective trough M of the trough belt 22, as shown in FIGS. 1*b*, 2*b*, i.e. with a predetermined target portion length 13, a predetermined target portion width 14, a predetermined left and right target edge distance 15R, 15L to the left and right edges of the trough M, and a front and rear target longitudinal distance 16*a*, 16*b* to the front and rear ends of the trough M.

Figure 2A:
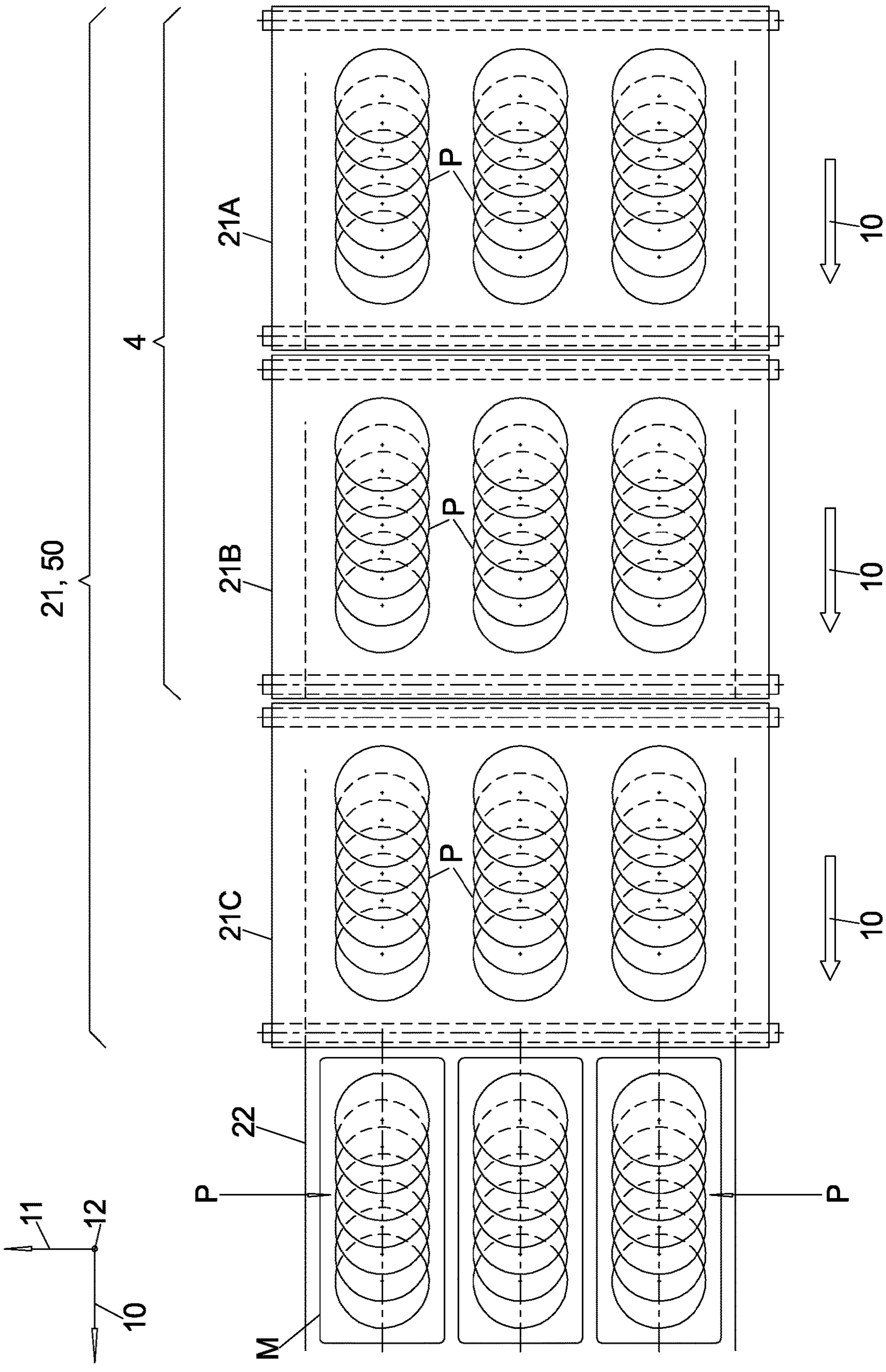
FIG. 2*a*: a top view of the area of the feeder and the downstream part of the trough belt with the portions already inserted into the troughs in this part of the trough belt.

Of course, the operator cannot yet see these distances to the edge of the trough in his observation area 4 on the upstream feeder 21 according to FIG. 2*a*, or only if they deviate very much from the nominal value, but he would notice conspicuous errors, especially within the portion, including the portion length.

Then the operator presses a stop button in the form of usually one of the operating elements 18 on the operating unit 20, whereupon at least the conveyor belts 21A, B located in the observation area 4 and/or in the display area 23, usually all the conveyor belts of the feeder 21, are stopped, and the operator can remove the reject portions A from the feeder 21.

Figure 3B:
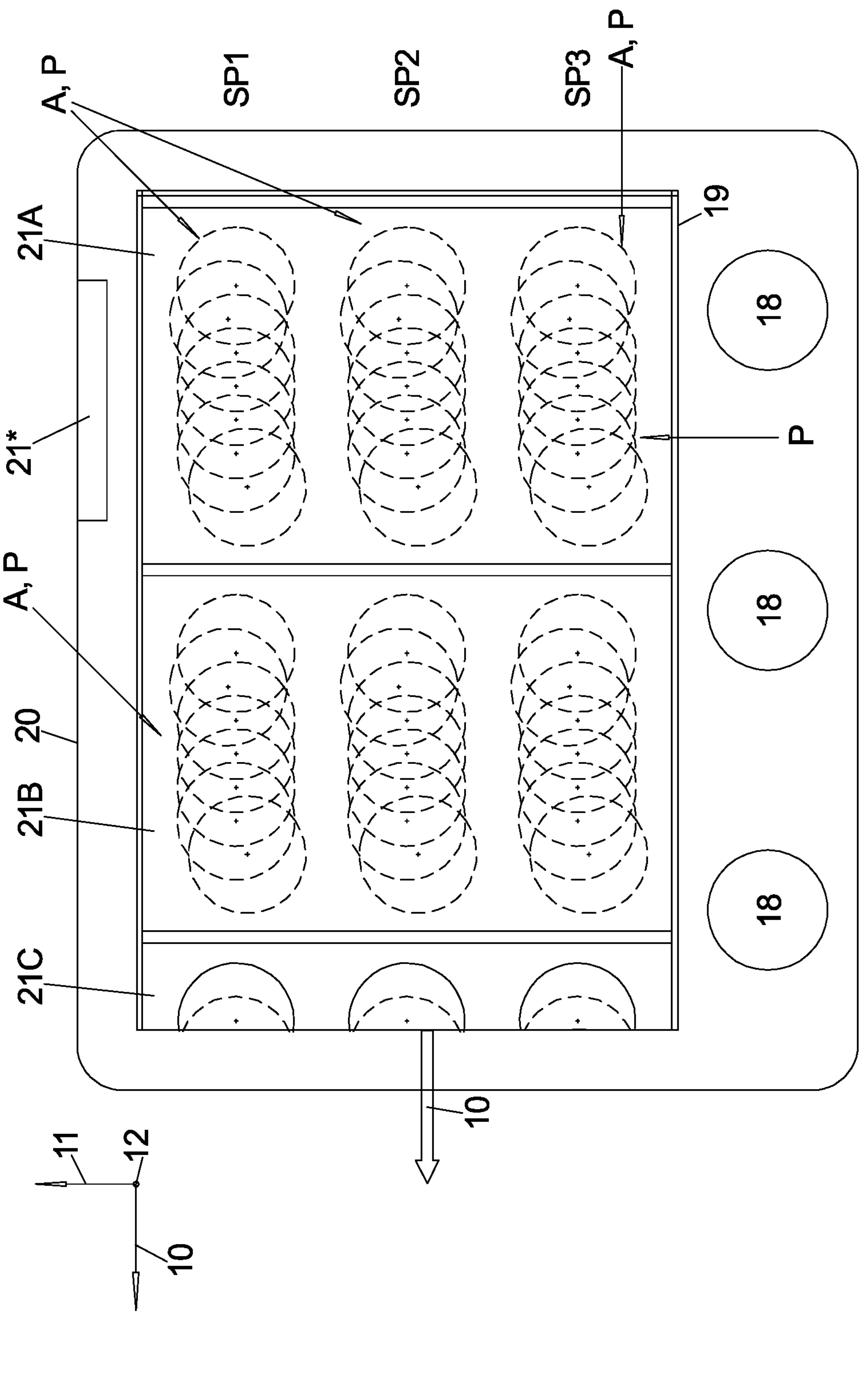
Figure 3C:
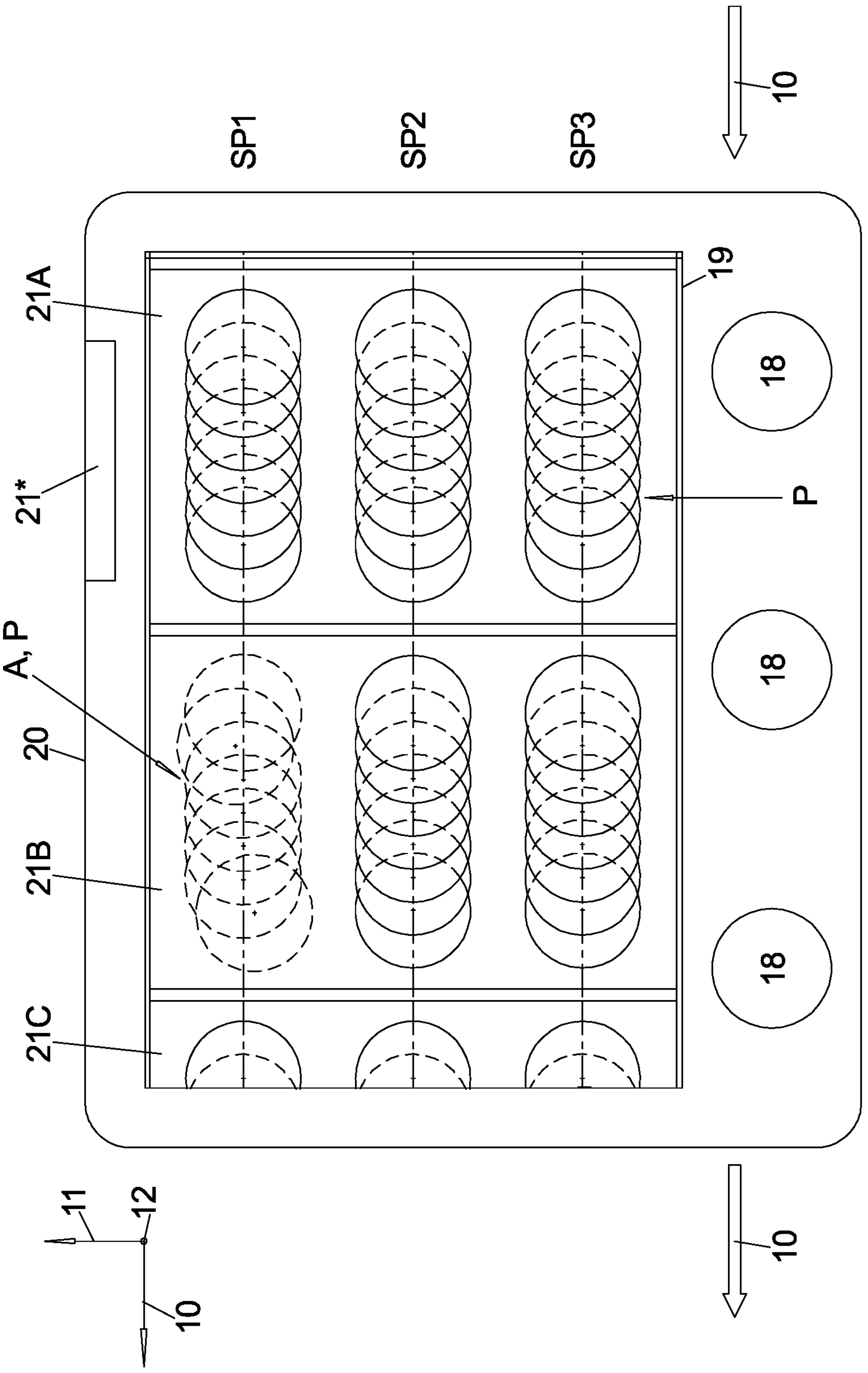

Since he observes the portions P—according to FIGS. 3*a* to 3*c*—on the display 19 of the operating unit 20, he can there—by tapping in the case of a touch-sensitive screen 19 or by clicking by means of a mouse-controlled cursor in the case of a non-touch-sensitive screen 19—also mark the reject portions as rejects A, which he also physically removes from the feeder 21 beforehand or afterwards.

The portions P marked as rejects A on the display 19 by the operator or the control 21* are either displayed there by the control after marking differently from the correct portions—shown as dashed lines in FIGS. 3*a*1, 3*b*, 3*c*—or deleted from the time of marking on the display 19 as shown analogously to FIG. 3*a*1 in FIG. 3*a*2, in any case, at the latest when it is no longer shown on the display 19, preferably as soon as it is marked, it is also deleted from the memory of the control 21* of the feeder 21 or of the control 500* of the entire packaging device 500, which includes the feeder 21.

In this way, the control 21* is able to automatically refill the gaps created by the removed reject(s) A on the feeder 21, if necessary, so that a—correct—portion P is also available for each trough M at the discharge point.

Instead of the operator, the control system 21* or 500* can also automatically detect and mark the reject, provided that it has a sufficiently well functioning image processing system, in particular supported by artificial intelligence, for optically detectable reject situations. The control then marks the reject on the screen and stops at least the conveyor belts visible on the display 19, i.e. those located in the display area 23 and/or those located in the monitoring area 4, so that the operator knows which is the reject A that he must remove from the feeder 21.

The control 21* can also mark portions P as rejects A which do not represent a visually recognizable reject situation, but which have been detected by other previous monitoring measures on the part of the control 21*, for example an incorrectly weighed portion detected by previous automatic weighing or slices in which an excessively high fat content has been detected due to scanning, e.g. of the cut surface of the caliber.

The visually recognizable errors that lead to rejects can be very different:

FIG. 3*a*1, for example, shows a reject situation in which the portions P on the uppermost track SP1 are obviously rejects A, because the distances between the slices within the portions on track SP1 are uneven compared to the correct portions on the tracks SP2 and SP3 below, and the portions P there are also too far forward in the passage direction 10 compared to the portions P on the parallel other tracks.

FIG. 3*a*2 shows in a representation analogous to FIG. 3*a*1 the representation on the display 19, if by marking portions as rejects it is caused that the control does not show these portions on the display 19 any more starting from the marking.

Such a reject A present only on one track and a gap existing after its removal can be closed by the control automatically—or also caused by manual input of the operator at the operating unit 20—only if the upstream slicer 1 can be controlled track-individually, i.e. with the help of empty cuts on the other tracks only portions on track SP1 can be supplied subsequently, in order to fill the gaps there after removal of the reject A, before the depositing of portions in the trough belt 22 is started again.

Of course, since obviously all portions arriving on track SP1 currently show this error, the cause of this system error on track SP1 should be searched for and eliminated beforehand so that correct portions P are delivered in the correct position on feeder 21 to fill the gaps on track SP1.

Filling the gaps on feeder 21 is only possible if feeder 21, i.e. its conveyor belts, is also divided into individual tracks that can be controlled separately and independently of each other. If this is not the case, either the troughs M in the trough belt 22, in this case three adjacent troughs in each case, are filled in several steps if necessary, or unfilled troughs M in the trough belt 22 are accepted.

In contrast, FIG. 3*b* shows a reject situation in which, from a certain point in time, only defective reject portions A are delivered to all tracks SP1, SP2, SP3. In this case, there is a system error on all tracks of the slicer or its discharge conveyor unit 17, which must be determined and corrected so that correct portions can then be produced again on all tracks.

The gaps on the feeder 21 caused by the removal of the reject(s) A can be closed more easily with a reject A running over the entire width of the feeder 21, in that the conveyor belt, in this case 21C, on which the last correct portions lie, remains stopped or is at least driven more slowly, and the one or more conveyor belts 21A, 21B upstream in the passage direction 10 are refilled with correct portions P by subsequently produced correct portions before the filling of the trough belt 22 is started again.

FIG. 3*c*, on the other hand, shows a reject situation in which only a single portion P on only one track SP1 and also on this track was not defective several times in succession, i.e. it represents reject A. In this case, the operator or the control system will react with a warning message.

In this case, the operator or the control also stops the feeder 21 and removes this single reject portion A and also marks it as removed on the display 21, but in most cases no troubleshooting measures are carried out on the slicer 1 or its discharge unit 17, in particular its portioning belt 17*a*, since it was obviously not a system error, but the reject A was caused by a one-time event and obviously will not occur again.

Figure 4:
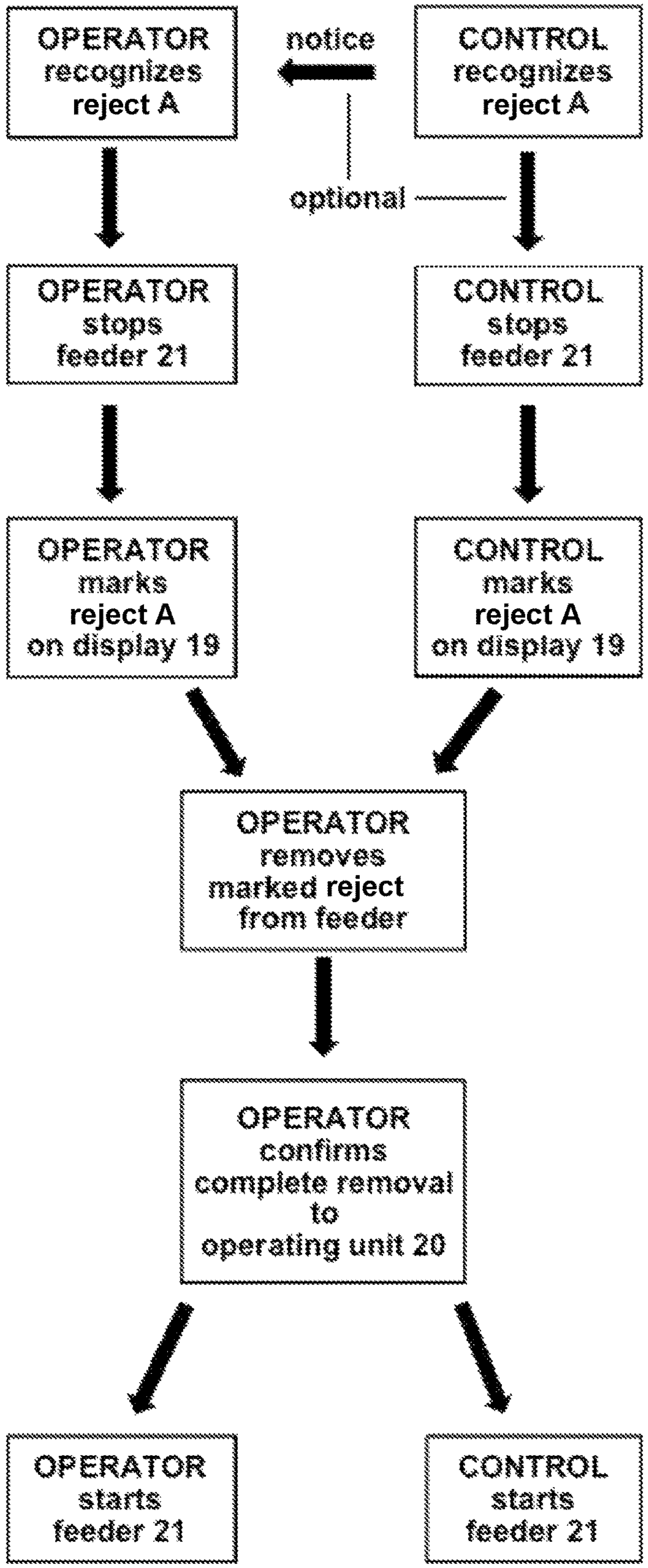
FIG. 4: a flow chart for eliminating rejects from the packaging machine.

FIG. 4 shows a flow chart of the operations described above:

First, the reject A must be recognized as such, then the feeder 21 must be stopped, and then the reject A must be marked as such on the display 19.

These three steps can be carried out by the operator or by the control if it has a sufficiently good automatic reject detection system, for example by means of image processing connected to the camera 13.

However, the control system can mark a portion that it suspects to be a reject merely as an indication to the operator on the display 19—in this case preferably in a different display mode than the portions already reliably marked as rejects—and leave the final decision to the operator, who must confirm this indication marking by further touching or clicking with the cursor.

Subsequently, the reject A marked on the display 19 must be removed from the feeder 21, i.e. cleared away, which is usually done by the operator, since automatic, mechanical removal by means of a robot or a pusher, for example, is time-consuming and involves the risk of leaving residues on the feeder 21.

The operator then confirms that the reject A has been completely removed, i.e. that all the reject marked on the display 19 has been removed from the feeder 21.

The feeder 21 can then be restarted, the time being determined either by the operator pressing a separate start button for this purpose, for example, or the feeder being started automatically by the control system, usually immediately after, or at a fixed time offset after, confirmation that the reject A has been completely cleared has been entered into the operating unit 20.

LIST OF REFERENCE NUMERALS

1 slicing machine, slicer
1* control
2 base frame
3 blades
3' rotation axis
3" blade plane, cutting plane
3*a* cutting edge
4 monitoring area
5 cutting frame
6 product opening
7 cutting unit
8 upper product guide, upper guide belt
9 bottom product guide, lower guide belt
10 passage direction through machine, longitudinal direction
10' supply direction
11 1st transverse direction (width transport unit)
12 2nd transverse direction, vertical
13 target portion length
14 target portion width
15L, 15R target edge distance
16 target length distance
17 discharge conveyor unit
17*a, b, c* portioning belt, discharge conveyor
18 operating element
19 display
20 operating unit
21 feeder
21A, B, C conveyor
22 trough belt
23.1, 23.2 display area
100 packaging machine
500 packaging device
A reject
K caliber
M trough, packaging trough
P portion
R edge
S slice

The invention claimed is:

1. A method for eliminating rejects from food pieces or portions transported in a single lane or multiple lanes along a transport section by a transport unit including a plurality of conveyors, the method comprising:

displaying, on a display of an operating unit, a realistic or symbolic representation of the food pieces or the portions located in or downstream of a monitoring area of the transport section, marking a portion or a food piece on the display as a reject, thereupon automatically changing a representation of the reject or removing the representation of the reject on the display, automatically removing data representing the reject from a memory of a control of the transport unit, in which memory data concerning the food pieces or the portions located in the transport unit are stored, stopping at least one conveyor of the plurality of conveyors, and removing the reject from the transport unit.

2. The method according to claim 1, wherein the removal of the reject from the transport unit takes place before or after the marking.

3. The method according to claim 1, further comprising confirming, by an operator at the operating unit, the removal of the reject from the transport unit.

4. The method according to claim 1, wherein after the marking and the changing of the representation of the reject on the display, a further input must be carried out in order to remove the representation of the reject on the display.

5. The method according to claim 1, wherein the marking and/or the removal of the reject from the transport unit are/is performed:

only for one lane, or for all lanes next to each other.

6. The method according to claim 1, wherein the stopping of the at least one conveyor for the removal of the reject is performed either after the reject has been marked on the display with the reject at a fixed, easily accessible longitudinal position, or by actuation of a stop switch by an operator, after which the operator marks the reject on the display.

7. The method according to claim 1, further comprising starting the at least one conveyor either by manual input by an operator at the operating unit, or automatically as soon as the removal of the reject from the transport unit is confirmed by the operator at the operating unit.

8. The method according to claim 1, wherein for the removal of the reject, either an indication of a possible reject is shown to an operator on the display and the reject verified or recognized by the operator is marked by the operator, or the control itself selects the reject and marks the reject on the display.

9. The method according to claim 1, wherein the removing of the reject from the transport unit comprises manually removing the reject from the transport unit.

10. The method according to claim 1, wherein the display comprises a touch-sensitive screen, and the marking of the portion or the food piece comprises touching a representation of the portion or the food piece on the touch-sensitive screen.

11. The method according to claim 1, wherein the marking of the portion or the food piece comprises clicking on a representation of the portion or the food piece on the display with a cursor.

12. The method according to claim 4, wherein the further input comprises a renewed selection of the reject.

* * * * *